Aug. 13, 1940.  A. E. WATERMAN  2,211,395
IRONCLAD CORN KEEPER
Filed Jan. 14, 1938    4 Sheets-Sheet 1

INVENTOR
ARTHUR E. WATERMAN
BY A. S. Krob
ATTORNEY

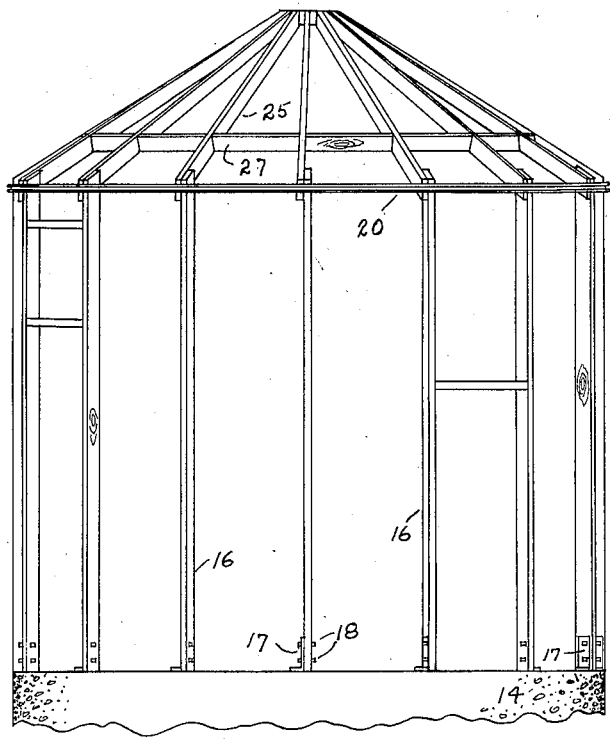
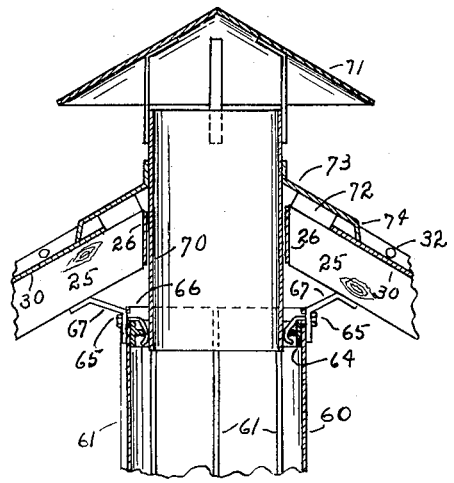
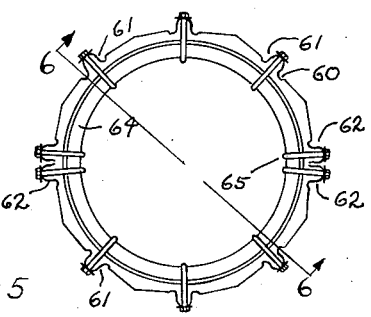

Aug. 13, 1940.   A. E. WATERMAN   2,211,395
IRONCLAD CORN KEEPER
Filed Jan. 14, 1938   4 Sheets-Sheet 3

INVENTOR
ARTHUR E. WATERMAN
BY  A.S.Krob
ATTORNEY

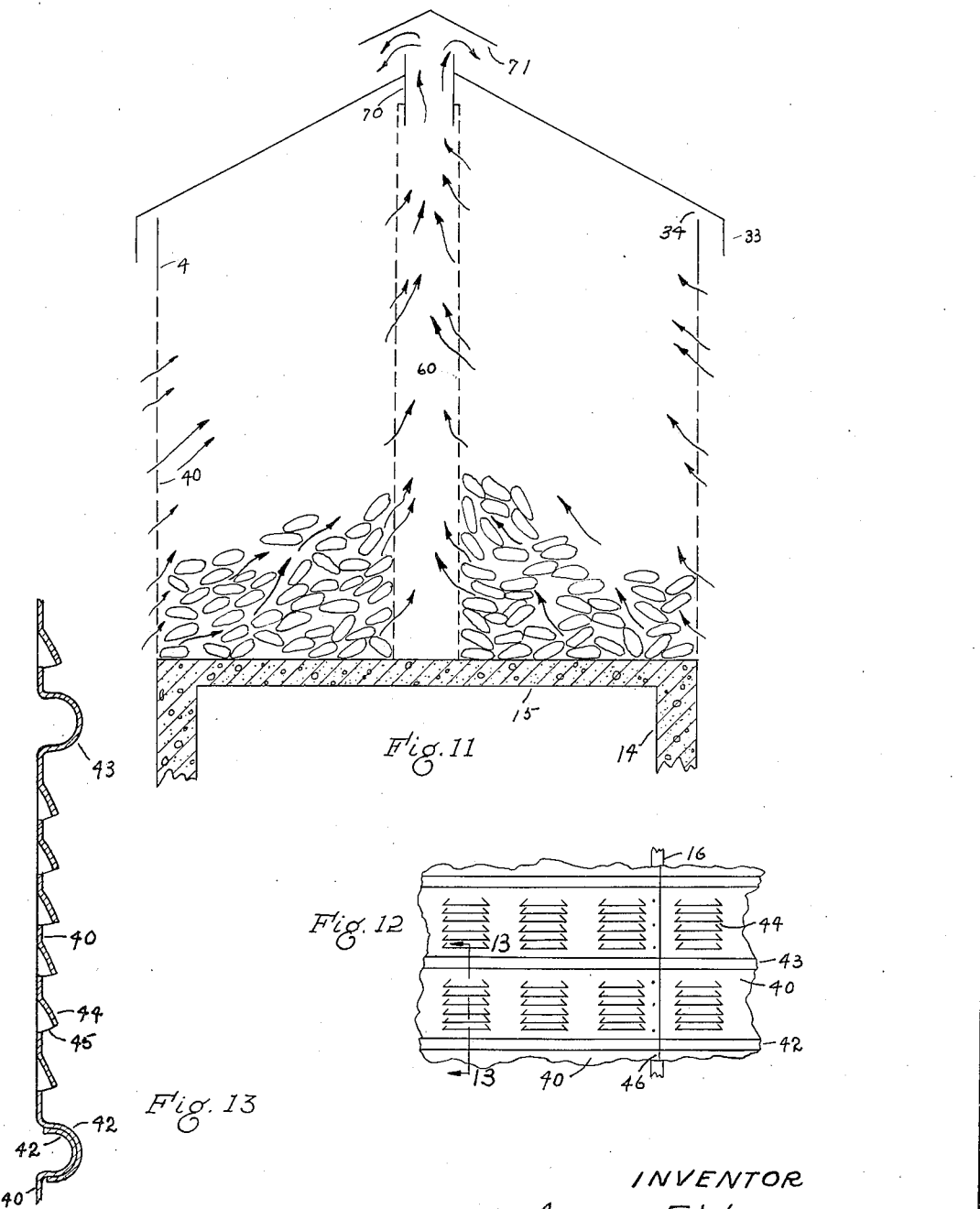

Patented Aug. 13, 1940

2,211,395

UNITED STATES PATENT OFFICE 2,211,395

IRONCLAD CORN KEEPER

Arthur E. Waterman, Fort Atkinson, Wis., assignor to James Manufacturing Company, Fort Atkinson, Wis., a company of Wisconsin Application January 14, 1938, Serial No. 184,943

5 Claims. (Cl. 189—3)

The present invention relates to buildings, the purpose of which is principally for storing ear corn, and has for its object, receiving the corn directly after being husked, and then dry-curing the corn in the mass in a manner which will insure curing each individual ear so as to give the corn the highest market and feed value, and keep it in this condition indefinitely. I therefore call my device a "corn keeper."

Another object of the present invention is to make the frame of the building preferably of wood and into an integral structure separate from the roofing and wall sheets which may then be securely and easily attached in a manner whereby they are individually and independently supported by the frame, the wall being left free to expand and contract but being adapted to add strength to the frame against twisting or warping when the structure is subjected to excessive wind storms and other abnormal strains. I therefore call the present invention an "ironclad corn keeper" because it is in fact an ironclad structure when completed.

An important object of my invention is to provide a skeleton frame of a design whereby it does not depend upon the wall sheets to take the roof and storage load nor the outward pressure resulting from the stored corn; thus the wall sheets may be louvered sufficiently for adequate ventilation without endangering the strength of the structure.

A still further object is to provide a structure which is pleasing in appearance, simple, easily erected at low cost, and one which is adapted to give maximum convenience, strength and durability.

A desirable feature of the present invention is that the design makes it possible for the ordinary farm help and carpenter to erect the building; and further, I have provided a building which may be securely mounted on either a concrete foundation or floor or on a plank flooring, the latter having skids if desired, whereby it may be moved about with safety.

Corn, grain and other crops, have a tendency to heat when placed in an unventilated mass. Thorough aeration is therefore highly essential. Ear corn lends itself especially well to scientific aeration because of the large voids between ears. I have provided means whereby abundant air will pass through the mass and be discharged from the inclosure under all atmospheric conditions, the means being such as will operate without the use of an imperforated floor as it will be noted that air may enter the building and pass through the storage space transversely into the center flue.

To these and other useful ends my invention consists of parts, combinations of parts, or their equivalents and mode of operation, as hereinafter described and claimed and shown in the accompanying drawings in which:

Fig. 4 is an elevational view of the skeleton frame.

Fig. 5 is a transverse section of the center air duct taken on line 5—5 of Figure 1.

Fig. 6 is a fractional vertical section of the air duct taken on line 6—6 of Figure 5 illustrating the roof point and outside ventilator, illustrating also its connection to the air duct.

Fig. 11 is a diagrammatic drawing in elevation, illustrating by arrows how the air passes through the stored corn and escapes through the center ventilating duct.

Fig. 12 is an enlarged side view of a fraction of the louvered sheets used for the outer walls.

Fig. 13 is a transverse section taken on line 13—13 of Figure 12.

Figure 7:
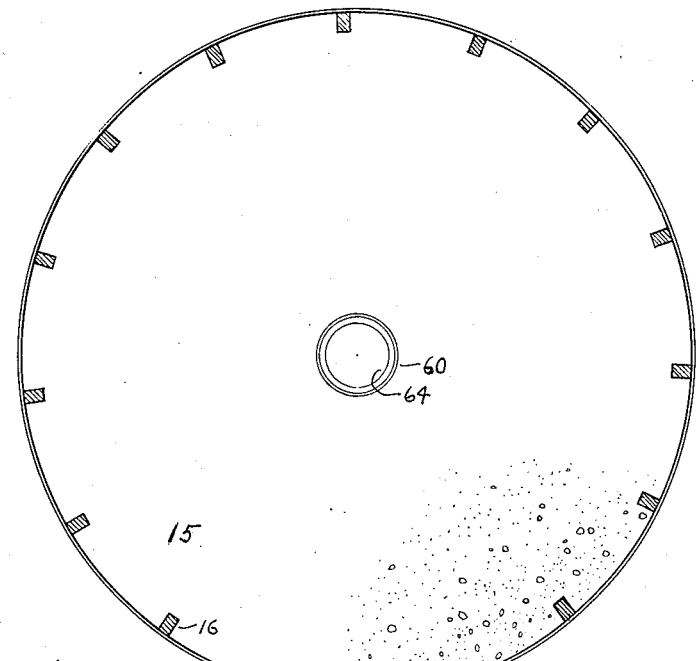
Fig. 7 is a transverse section of the building taken on line 7—7 of Figure 1.
Figure 8:
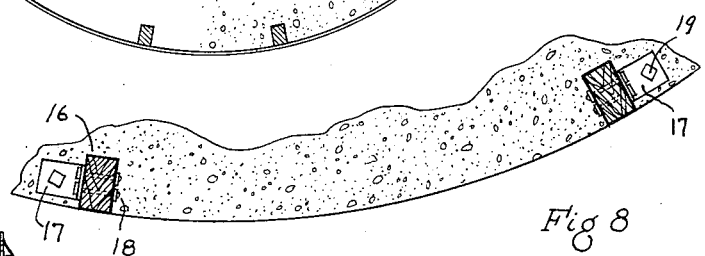
Fig. 8 is an enlarged horizontal section of a fraction of the building as shown in Figure 7.

As thus illustrated, my improved corn keeper comprises preferably a concrete foundation 14 which is preferably circular and having preferably a concrete floor 15 as illustrated in Figures 7 and 11.

I provide spaced vertical studs 16 which are preferably secured to the foundation 14 by means of L-irons 17. The L-irons are secured to the studs by bolts 18—18 and are secured to the foundation by means of bolts 19.

Figures 2, 3:
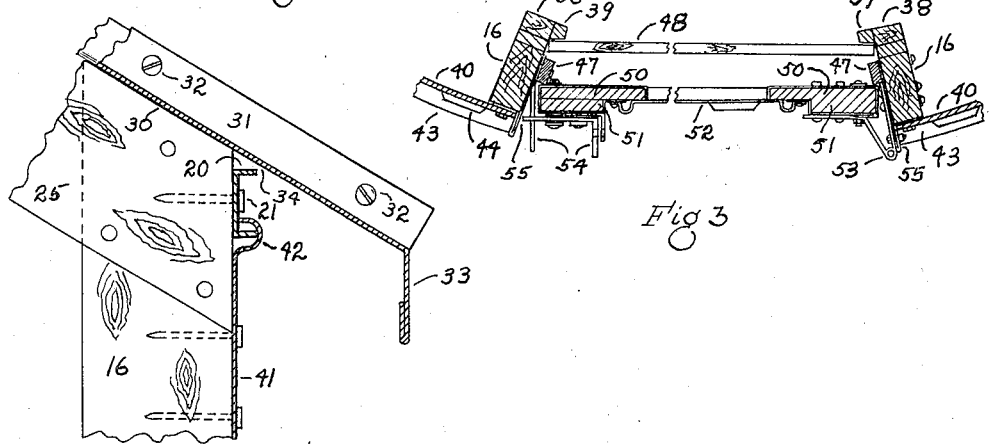
Fig. 2 is a fractional section of the building taken on line 2—2 of Figure 1.
Fig. 3 is a transverse horizontal section of the entrance door taken on line 3—3 of Figure 1, the door being shown in its closed position.

The top ends of the studs 16 are held in spaced relation by means of a channel ring 20 (see Figure 2). This ring is held to the studding by means of bolts 21 or otherwise, the channel being spaced a short distance from the top end of the stud as clearly illustrated in Figure 2.

I provide roof rafters 25 which are secured to studs 16 by means of bolts or nails as illustrated in Figure 2, the inner ends being held in spaced relation by means of ring 26 (see Figure 6) and being adapted to form a circular opening for the reception of the ventilator duct as will hereinafter appear.

I preferably provide braces 27 for the roof rafters as illustrated in Figure 4. Thus it will be seen that I have provided a skeleton frame work which is preferably made from wood providing a suitable support for the roof plates and outside wall of the building as follows:

I provide a sheet metal roof which is preferably formed into triangularly shaped sections 30, each section being adapted to fill the space between adjacent rafters 25 and rest on braces 27 to prevent sagging, the edges lying preferably over the rafters, one edge being turned up and the adjacent edge 31 being folded over this upturned edge so as to make a conventional water tight joint between the sections. I position these joints over the rafters, preferably slightly in an out-of-center position, and secure the sections to the rafters at a point adjacent the joint preferably by means of suitable nails as at 29 (see Figure 1). The folds are secured together preferably by means of spaced bolts as at 32. The outer edges of sections 30 are bent downwardly as at 33, thus to provide a water-drip and wind shield for the annular opening 34 which is formed by the space between members 20 and 30 as illustrated in Figure 2.

I provide a scuttle opening and a lid 35 for the same, the construction and use of which are too well known to require further description.

I provide novel metal outside walls for the enclosure in the form of louvered sheets 40 and plain sheets 41 as follows:

These wall sheets are made preferably rectangular in shape and positioned horizontally as illustrated, the top and bottom edges of each sheet being shaped into ribs as at 42, thus the top rib of each sheet may be enclosed by the bottom rib of the adjacent sheet as illustrated in Figure 13. I preferably make each sheet wide enough to accommodate one or more spaced ribs or corrugations 43, thus to stiffen the sheets and improve the appearance of the building.

Sheets 40 are supplied with vertical rows of horizontally positioned louvers 44, (see Figures 12 and 13) thus providing a multiplicity of narrow slits 45 for the passage of air into the building as illustrated by arrows in Figure 11. The ends of the sheets are lapped as at 46 and secured to studs 16 by means of large headed and washered nails (see Figure 12). The rows of louvers are positioned vertically so contact is made to the studding on the smooth vertical surface between the rows. Sheets 41 are not louvered, the top rib 42 being folded over the lower flange of ring 20 (see Figure 2).

Figure 1:
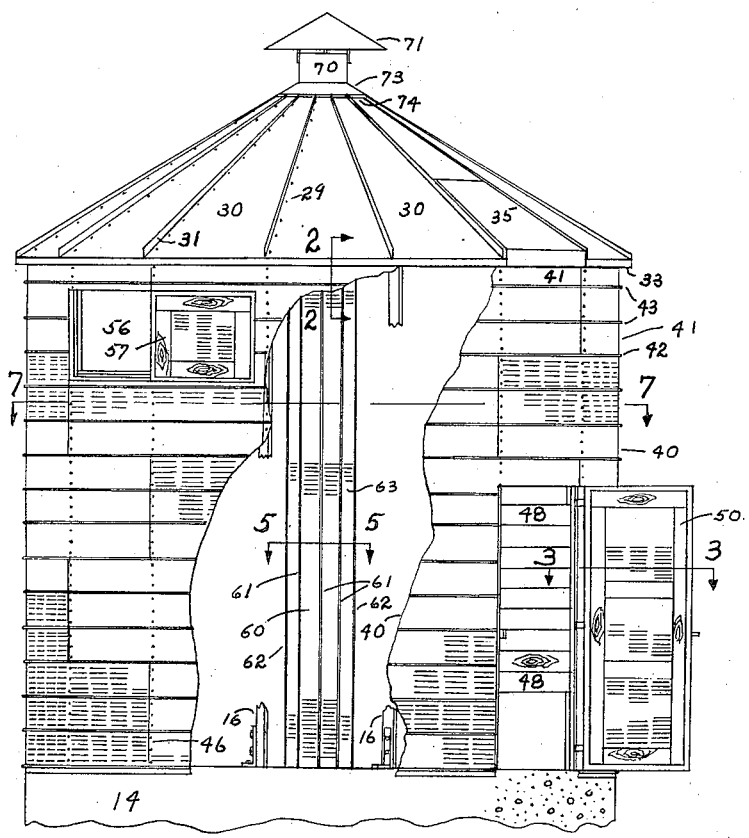
Fig. 1 is a plan elevation of my complete corn keeper having a portion of the wall cut away to thereby expose the center flue to view.
Figure 9:
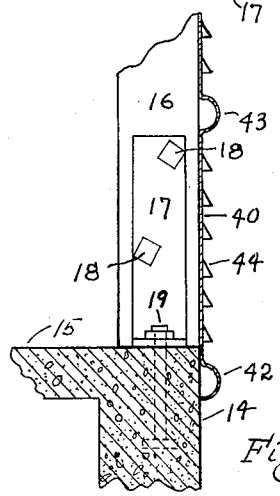
Fig. 9 is an enlarged fraction of one of the studs illustrating its fastening to the foundation.

Thus it will be seen that there is shown in Figure 1, four rows of louvered sheets 40 and a top row of sheets 41 without louvers, each sheet having two ribs 43. The number of ribs per sheet is optional, and the length of the sheets is also optional. In Figure 1 I illustrate the sheets as forming joints at every other stud, the joints being preferably staggered. The bottom sheets are positioned so they extend below the top of foundation 14 as clearly illustrated in Figure 9.

By referring to Figures 12 and 13 it will be seen that the louvers are long and closely spaced but shaped to form narrow slits to thereby prevent rats or mice from entering the building through the louvered openings.

In buildings of the class it is necessary to provide a large entrance door and one or more small filling doors in the wall of the building in addition to the roof chute already described. I provide preferably a large entrance door as illustrated in Figures 1 and 3, having a suitable frame wherein two of the studs 16 will answer as the side member having the usual appurtenances with which to make a complete door frame.

I provide strips 38—38 which are secured to studs 16, each having an inwardly extending flange 39—39 which cooperates with door jambs 47—47 to form grooves for the reception of filler boards 48; the lower board being positioned a short distance from the floor of the building whereby the building may be filled with corn and the corn removed at the opening left below the lower board. After enough of the corn has been removed so these boards are no longer necessary they may be removed as is customary in devices of the kind.

The door comprises preferably a suitable frame 50 having stiffening members 51 leaving preferably a considerable space within the door frame which is filled preferably by means of louvered sheets 52 which are similar to sheets 40, thus to harmonize with the louvered sheets 40 on the building. The door is preferably hinged to the door frame as at 53 and having a suitable latching device 54 which may be supplied with suitable means for locking the door by padlock or otherwise.

I provide a suitable shroud 55 for the door frame, as illustrated in Figure 3. I provide one or more suitably positioned openings 56 in the wall of the building having a door 57, this door being preferably similar to the large door whereby when it is closed, it also will harmonize with the general appearance of the building.

A valuable and distinctive feature of my iron-clad corn keeper is the manner in which sheets 40 and 41 are secured to the studs whereby they are free to contract and expand vertically and horizontally and whereby they will not be required to support any part of the building nor any part of the weight of its contents. Studs 16 are positioned close enough together so they will take the major part of the outward thrust of the corn because the ears tend to bridge across the gap between the studs. Thus the weight is largely supported directly on the floor of the building and while sheets 40 and 41 are entirely carried by the studs, clearly they will act to fix the normal position of the studs in a manner which will form a structure which cannot be bulged, twisted or sagged by the action of the elements nor injured by the action of the corn or material stored therein.

The wall sheets effectively counteract the outward thrust of the stored material similar to the hoops on a barrel, the studs being largely equivalent to the staves of a barrel because of their close spacing so as to take the major part of the outward thrust of the stored crop.

I provide a center ventilating and outlet flue as follows:

Vertical sheets 60—60 of the desired length are provided preferably with edge ribs 62 and a number of spaced ribs 61 which are similarly shaped (see Figure 5). I provide rows of closely spaced horizontally positioned louvers 63, which are preferably very similar to louvers 44. Sheets 60 are preferably made integral but may comprise two or more lengths being superimposed and suitably secured together.

Sheets 60 are of a width so two of these sheets may be bent into semicircles so they form a round duct which is secured to a number of spaced rings 64 (one only being shown) by means of bolts 65, thus when the bolts are made taut a very strong and rigid louvered duct is provided which is suitably anchored to the floor of the building and terminating at the top as at 66 and having suitably shaped anchor bars 67 which are secured to the rafters as illustrated in Figure 6. Thus the duct will be anchored at each end and will be very rigid and strong because of vertical ribs 61 and 62.

I provide a duct 70 which preferably fits snugly into ring 64 and protrudes through the roof opening formed by ring 26 and having on its end a suitably shaped and anchored ventilator cap 71.

I provide a flashing strip 72 and support thereon a metal flashing skirt 73 the outer edges being cut away so the remainder may be bent down as at 74 thus to make a joint which is sealed against the entrance of water under the flashing.

Figure 10:
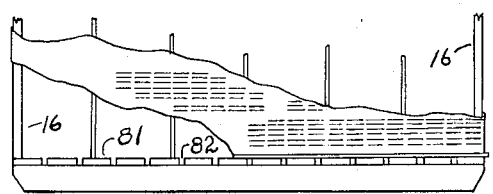
Fig. 10 illustrates fractionally in reduced size a modified form of the foundation floor.

In Figure 10 I illustrate a modification wherein the foundation or support for the building differs materially from that shown in the other figures. This modification comprises spaced planks 80 and narrow planks 81 positioned transversely of the spaced planks, planks 81 being separated to thereby form relatively narrow openings 82; thus provision is made for the passage of air between the planks and up into the building through openings 82.

Thus it will be seen that I have provided a strong, neat in appearance, and serviceable building which is adapted to store ear corn and other crops and preserve the crop in the most efficient manner.

Having thus shown and described my invention I claim:

1. A storage device of the class described comprising a building having a ventilating duct positioned within the space normally occupied by the goods stored, said duct comprising a number of spaced rings, one or more sheets having a number of spaced parallel ribs secured to the rings by means of spaced bolts which extend through said ribs, a multiplicity of closely spaced horizontally positioned louvers between said ribs and adapted to occupy the major space therebetween, said duct having an outlet which extends through the roof of the building and having on its protruding end of a ventilating cap.

2. A frame structure of the class described, comprising a foundation and a circular in horizontal section skeleton frame secured thereto, said frame comprising spaced vertical studs and a metal ring positioned therearound at the upper end thereof, roof rafters adapted to form a cone shaped roof covering support each being secured to the side of a stud the end being flush with the outer surface of the stud and resting against the inner surface of said ring.

3. A structure of the class described, comprising a foundation and a circular in horizontal section skeleton frame secured thereto, said frame comprising spaced vertical studs and a metal ring positioned therearound at the upper end thereof, roof rafters adapted to form a cone shaped roof covering support each being secured to the side of a stud the end being flush with the outer surface of the stud and resting against the inner surface of said ring, a roof covering positioned on said rafters, the outer edge extending a distance outwardly and downwardly past said ring, said ring being positioned below the plane of the top surface of the rafter thereby leaving an air space between the ring and roof covering.

4. A building of the class described, comprising a foundation and a circular in horizontal section frame secured thereto, said frame comprising spaced vertical studs and a metal ring positioned therearound at the upper end thereof, roof rafters adapted to form a cone shaped roof covering support each being secured to the side of a stud, the end being flush with the outer surface of the stud and resting against the inner surface of said ring, a roof covering positioned on said rafters, the outer edge extending a distance outwardly and downwardly past said ring, said ring being positioned below the plane of the top surface of the rafter thereby leaving an air space between the ring and roof covering, a sheet metal covering secured to the outer surface of said studs and extending from said ring to said foundation.

5. A building of the class described, comprising a foundation and a circular in horizontal section frame secured thereto, said frame comprising spaced vertical studs and a metal ring positioned therearound at the upper end thereof, roof rafters adapted to form a cone shaped roof covering support each being secured to the side of a stud, the end being flush with the outer surface of the stud and resting against the inner surface of said ring, a roof covering positioned on said rafters, the outer edge extending a distance outwardly and downwardly past said ring, said ring being positioned below the top plane of the rafter thereby leaving an air space between the ring and roof covering, a sheet metal covering secured to the outer surface of said studs and extending from said ring to said foundation, said covering comprising a number of horizontal bands of sheet metal, the bands each having a number of spaced horizontal ridges each band being divided into a number of lengths having their ends lapped and secured to a stud, said lengths contacting three or more studs and being positioned in staggered relation.

ARTHUR E. WATERMAN.